W. B. GREENLEAF.
MACHINE FOR MAKING COILED WIRE SPRINGS.
APPLICATION FILED DEC. 20, 1913.
1,113,779. Patented Oct. 13, 1914.
2 SHEETS—SHEET 1.
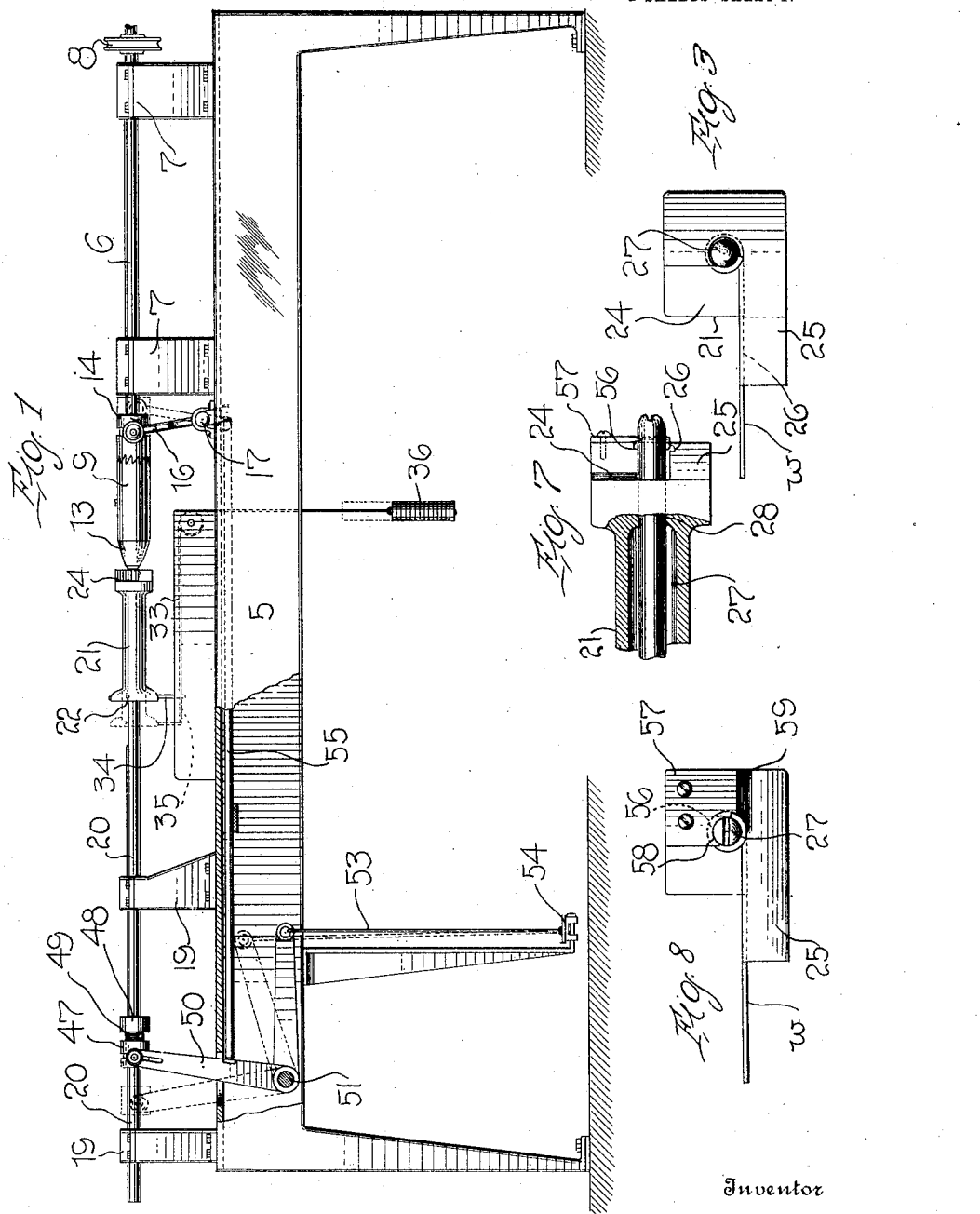
Witnesses
Robert M. Lutgen
A. I. Hurd
Inventor
W. B. Greenleaf
By Watson E. Coleman
Attorney

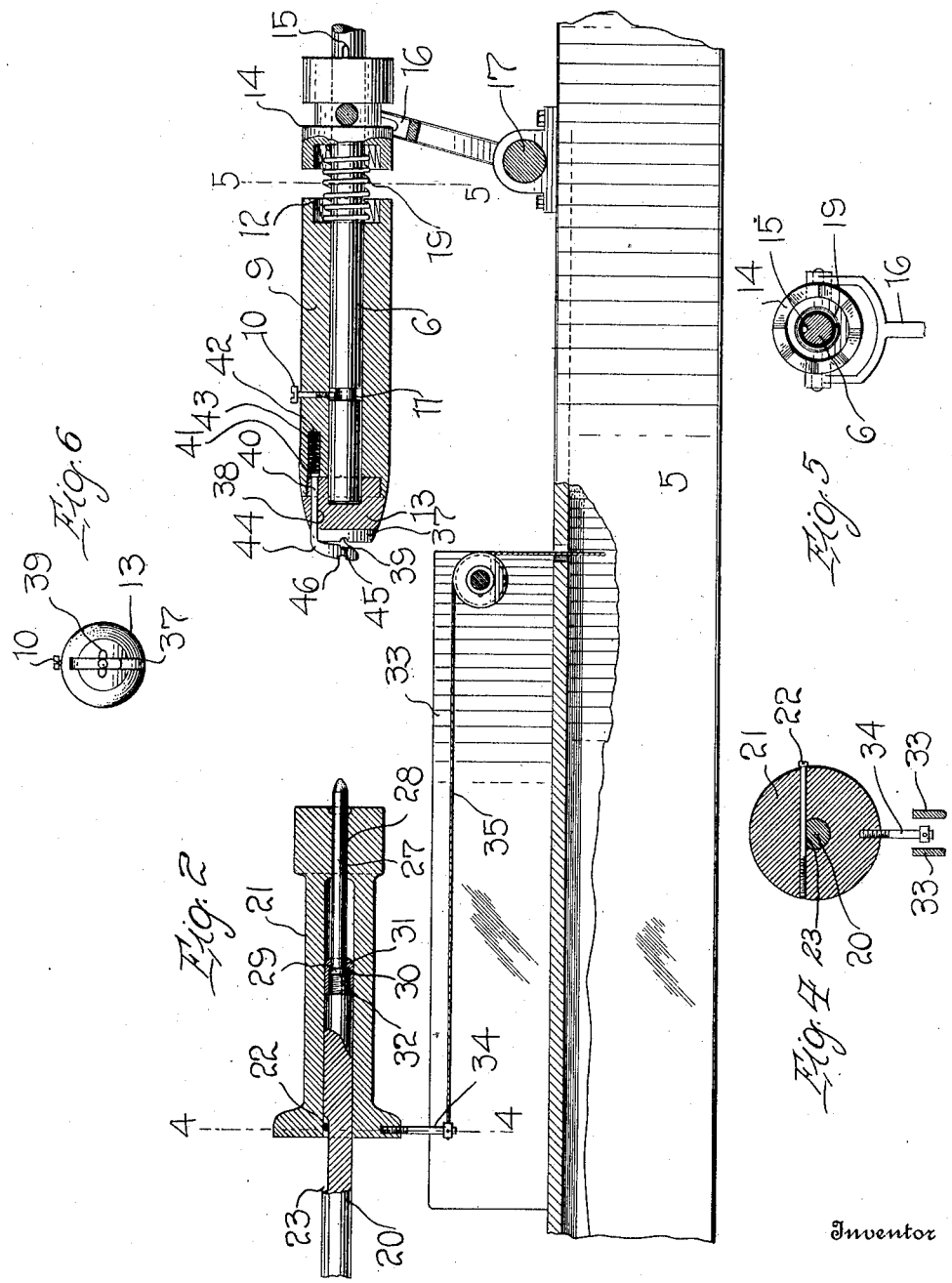

UNITED STATES PATENT OFFICE.

WILLIAM B. GREENLEAF, OF NASHVILLE, TENNESSEE.

MACHINE FOR MAKING COILED WIRE SPRINGS.

1,113,779.  Specification of Letters Patent.  Patented Oct. 13, 1914.

Application filed December 20, 1913. Serial No. 808,008.

*To all whom it may concern:*

Be it known that I, WILLIAM B. GREENLEAF, citizen of the United States, residing at Nashville, in the county of Davidson and State of Tennessee, have invented certain new and useful Improvements in Machines for Making Coiled Wire Springs, of which the following is a specification, reference being had to the accompanying drawings.

This invention relates to machines for forming coiled wire springs and has for its principal object to provide a machine for this purpose whereby a large number of coiled springs may be accurately and expeditiously formed with a minimum of manual labor upon the part of the operator.

The invention has for another and more particular object to provide a rotatable mandrel, a chuck to which one end of the spring wire is adapted to be connected, means for moving the point of the mandrel into engagement with the chuck and connecting the chuck to the operating shaft whereby the chuck is rotated to coil the wire around the mandrel, said mandrel being freely rotatable with the wire coils, whereby friction is practically eliminated.

My invention has for another and very important object to provide means mounted upon the chuck and adapted for engagement by the point of the mandrel whereby the end of the wire is maintained in connection with the chuck during the forming of the spring coils.

My invention has for a further object to provided a former of improved construction, gravity means acting in the operation of the machine to hold the nose of the former up against the end coil of the spring, and means for removably mounting the rotatable mandrel in the former whereby mandrels of different sizes may be readily applied thereto in accordance with the desired size of the spring.

My invention has for a further object to produce a machine for the above purpose consisting of comparatively few elements which are all of simple form, thereby rendering the machine highly efficient in practical operation, capable of manufacture at comparatively small cost and obviating the necessity of frequently stopping the machine for the purpose of repairs.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a machine embodying my invention in its preferred form, showing the operative positions of the several parts during the formation of a coiled spring, the released or inoperative position of the former being shown in dotted lines; Fig. 2 is an enlarged longitudinal section through the former and chuck; Fig. 3 is an enlarged end elevation of the former; Fig. 4 is a section taken on the line 4—4 of Fig. 2; Fig. 5 is a section taken on line 5—5 of Fig. 2; Fig. 6 is an enlarged end elevation of the chuck; Figs. 7 and 8 are a detail fragmentary section and an end elevation respectively of the former illustrating the application of the detachable plate thereto which is employed when compression springs are to be formed to properly space the successive coils.

Referring in detail to the drawings, 5 indicates a suitable base, preferably similar to that employed in the construction of a light lathe, said bed or base being mounted upon the usual supports. Upon one end of this base 5, a spindle 6 is rotatably mounted in suitable bearings provided in the spaced standards 7. A belt wheel 8 is fixed upon one end of this shaft to be traversed by a suitable driving connection from a convenient power source. Upon the other end of the spindle 6, the chuck 9 is mounted, said chuck being provided with a set-screw 10 which is adapted to be adjusted so that the inner end thereof fits loosely in an annular groove 11 provided in the periphery of the spindle 6. One end of the chuck body is provided with suitable clutch teeth 12 while upon the other end thereof, a removable cap piece 13 is threaded. The purpose of this detachable cap will be later explained in detail. It will be apparent that by mounting the chuck upon the spindle 6 in this manner, said spindle may be rotated freely with respect to the chuck. The chuck is however, adapted to be locked upon the spindle to rotate therewith by means of a sliding jaw or clutch member 14, which is splined or keyed upon the spindle as shown at 15 and is adapted to be moved longitudinally through the medium of a yoke 16 which is fulcrumed as at 17 upon the bed or base 5. Between the toothed face of the sliding jaw or clutch 14 and the toothed end of the clutch body 9, a coiled spring 18 is arranged upon the spindle and yieldingly acts to maintain the jaw in spaced relation to the chuck.

Upon the opposite end of the base 5 in suitable spaced bearing standards or supports 19 a longitudinally slidable shaft 20 is mounted. Upon the end of the shaft 20 which is opposed to the spindle 6, a former generally indicated by the numeral 21 is mounted. This former consists of an elongated cylindrical body having a longitudinal bore in which the shaft 20 loosely fits. A key or pin 22 is transversely disposed through the rear end of the former body and extends across the flat face of a longitudinal channel 23 formed in the periphery of the shaft 20. The former is thus held against turning movement upon the shaft but is permitted to move longitudinally with respect thereto to a limited extent. The other or forward end of the body of the former 21 is cut away as indicated at 24 and from this recessed or cut out end portion of the body, a laterally projecting guide or run-way 25 extends and is preferably provided in its upper surface with a channel or groove indicated at 26 for the wire w, whereby the wire is properly led or directed to the mandrel around which it is to be coiled or turned.

The mandrel 27 extends through an opening 28 in the closed forward end of the body of the former 21 and into the bore thereof, and one end of this cylindrical mandrel is provided with a head 29 for engagement with the annular shoulder 31 formed upon the interiorly threaded cap 30 which is loosely fitted upon the mandrel. This cap is adapted to be detachably threaded upon the forward reduced end 32 of the shaft 20. By connecting the mandrel to the end of the shaft in this manner, it will be apparent that the mandrel is entirely free for rotation with respect to said shaft and may be easily and quickly attached thereto or disconnected therefrom and other mandrels of various sizes substituted therefor. The diameter of the mandrel determines the internal diameter of the coiled spring which will be formed.

Upon the bed or base 5, upstanding parallel guide plates 33 are secured and between the same a pin 34 depending from the rear end of the body of the former 21 is disposed. To this pin, one end of a cable, chain or other flexible element 35 is attached, the other end of said element being provided with a suitable weight 36. It will be understood that this weight acts by gravity to hold the former 21 in its forward position upon the longitudinal shiftable shaft 20.

In order to obviate loss of time, I have devised efficient means for quickly and securely attaching one end of the spring wire w to the chuck 9. For this purpose, I provide the end face of the detachable cap 13 of the chuck with a diametrically extending groove or channel 37, into which the outer end of a longitudinal opening 38 formed in said cap opens. A short groove 39 bisects the groove or channel 37, said groove 39 being of a width sufficient to receive the wire, the circumferential extent of said groove being sufficient to form a loop in the wire which will be substantially equal in diameter to the diameter of the largest size spring to be made. A rod or pin 40 is loosely fitted into the longitudinal opening 38 in the cap 13 and is provided with a head 41 on its inner end disposed in a socket 42 formed in the body of the chuck 9. A coiled spring 43 arranged in this socket bears against the head of the pin and normally acts to force the same outwardly. The outer end of the pin 40 is flattened or of angular form in cross section and angularly disposed to extend in substantially parallel relation to the slot 37 in the cap 13, as indicated at 44. This flattened end of the pin is provided adjacent its extremity and in its opposite edges with notches 45 and 46 respectively, the purpose of which will be made manifest in the subsequent description of the operation of the machine.

Upon the shaft 20 between the bearing standards 19, sleeve 47 is loosely mounted, and between one end of this sleeve and a collar 48 fixed upon the shaft, a spring 49 is arranged. A bell-crank lever 50 is fulcrumed on a transverse rod 51 mounted in the base 5 and the upper end of one arm of this lever is provided with a suitable yoke connected to the sleeve 47 whereby said sleeve may be actuated to compress the spring 49 and shift the shaft 20. The other arm of the lever 50 is connected by means of a suitable pitman-rod 53 with a foot-treadle 54. A longitudinally extending bar 55 is mounted for sliding movement in suitable guides provided on the base and is pivotally connected at one of its ends to the lower end of the lever 16. The other end of the bar 55 is disposed contiguous to the upwardly extending arm of the bell-crank lever 50.

It will be particularly noted from reference to Figs. 7 and 8 that the end of the body of the former 21 at one side of the recess 24 therein is provided with a substantially semi-circular groove or channel 56 extending in concentric relation to the mandrel 27, and said groove constitutes a continuation of the groove 26 in the upper surface of the guide extension 25. In this semi-circular groove or channel, the coils of the spring are successively formed. When it is desired to produce compression springs, in order to properly space the spring coils, I provide a plate 57 having a semi-circular notch or recess 58 in one corner which closely surrounds the mandrel 27 and said plate is further provided with a knife or beveled edge 59 which is adapted to be received between the spring coils and spread the same. Several of these plates may be provided, the same being of various thicknesses so that the coils of the spring may be separated to any desired extent.

Having above described the particular construction and arrangement of the several parts of my machine, its operation will be understood as follows: One end of the wire from which the spring is to be formed is placed in the groove 39 provided upon the end face of the chuck and the operator then presses upon the treadle 54 with his foot. The bell crank lever 50 is thus shifted and its upwardly extending arm thrown to the right, thereby also shifting the shaft 20 carrying the mandrel 27 to the right. In this movement, it will be understood that the weight 36 maintains the former 21 in its forward position upon the end of the shaft. The end of the mandrel 27 which projects beyond the nose of the former engages in the notch 46 provided in the angularly disposed end 44 of the rod or pin 40, and forces said rod inwardly against the action of the spring 43. The wire w is received in the other notch 45 and forced inwardly into the semi-circular groove 39, the flat end portion 44 of the pin 40 being received in the channel or groove 37. It will therefore be obvious that the end of the wire is bent to form a loop. At the same time the operator grasps the wire and pulls the same outwardly from between the end of the chuck and the mandrel so that it extends at right angles to the axis of the shaft 20, and disposes said wire in the groove of the guide or run-way 25. When the upwardly extending arm of the lever 50, reaches its extreme position as shown in full lines in Fig. 1, the same engages the end of the longitudinal bar 55 and shifts said bar to operate the lever 16 and slide the jaw or clutch member 14 upon the spindle 6 into engagement with the clutch teeth on the end of the chuck 9, thereby locking said chuck to the spindle so that it will be rotated therewith. When the end of the wire is connected to the chuck in the manner above stated, it will be obvious that said wire will be wound around the mandrel 27 as the chuck is revolved. It will also be appreciated that as the mandrel is perfectly free to revolve with the spring, that friction is practically eliminated. As the spring is formed, the former 21 is forced backwardly or rearwardly upon the shaft 20 but the nose of the former is held closely against the last formed coil until the wire has been wound to form the entire length of the spring, by means of the weight 36. At the completion of the operation, the treadle 54 is released and the shaft 20 drawn back to permit the spring to be removed from the end of the chuck 9.

From the foregoing, it is believed that the construction and manner of operation of my improved machine will be clearly and fully understood. By the provision of my improved means for attaching the end of the wire to the chuck, loss of time in placing the wire in position is minimized and a large number of springs may be accurately formed in a comparatively short period of time. When the machine is operated without the use of the plate 57, it will be understood that an expansion spring is formed in which the several coils are closely engaged with each other. When it is desired to form a compression spring, the plate 57 may be readily applied to the nose of the former so that the same will operate in the manner above explained to properly space the successive coils as they are formed.

It will be understood that in putting my invention into practical use, various minor mechanical alterations may be deemed advisable and I therefore reserve the privilege of resorting to all such legitimate modifications as may fairly fall within the spirit and scope of the appended claims.

Having thus described the invention, what is claimed is:

1. In a machine of the character described, an operating spindle, a chuck mounted on said spindle, means for holding the end of a wire in connection with said chuck, and a longitudinally shiftable freely rotatable mandrel adapted to engage and actuate said holding means, said mandrel being rotatable with the wire as it is wound about the same in the operation of the chuck.

2. In a machine of the character described, an operating spindle, a longitudinally shiftable former, a mandrel rotatably mounted in the former, means for shifting the mandrel and former into operative relation to the spindle, and means for connecting one end of a wire to the spindle whereby the same is wound about the mandrel and a succession of coils formed therein by the former, said mandrel being rotatable with said coils.

3. In a machine of the character described, an operating spindle, a chuck loosely mounted upon the spindle, a slidable clutch to lock the chuck upon the spindle, means for attaching one end of a wire to the chuck, a longitudinally shiftable former, and means to shift said former to operative position with relation to the chuck, and subsequently operate the clutch to lock the chuck upon the spindle.

4. In a machine of the character described, an operating spindle, a chuck loosely mounted upon said spindle, a slidable clutch to lock the chuck upon the spindle, means for holding a wire in connection with said chuck, a longitudinally shiftable former, a mandrel carried by the former, and means to shift said former to operatively position the same with relation to the chuck and engage the mandrel with said wire holding means whereby the latter is actuated, and then subsequently shift said clutch to lock the chuck upon the operating spindle.

5. In a machine of the character described, an operating spindle, a chuck mounted upon said spindle, means for attaching one end of a wire to said chuck, a longitudinally shiftable shaft, a non-rotatable former mounted upon said shaft and having limited longitudinal movement with respect thereto, means for shifting the shaft to dispose the former in operative position with relation to the chuck, and gravity means connected to the former to yieldingly hold the same against longitudinal movement on the shaft in one direction and in engagement with the work.

6. In a machine of the character described, an operating spindle, a chuck mounted upon said spindle, means for holding a wire in connection with said chuck, a longitudinally shiftable shaft, a non-rotatable former mounted upon said shaft and having limited longitudinal movement with respect thereto, a mandrel rotatably connected to said shaft and extending through the former beyond one end thereof, means for shifting the shaft to dispose the former in operative relation to the chuck and engage the projecting end of the mandrel with said wire holding means to actuate the latter, and additional means acting to yieldingly hold the former against longitudinal movement in one direction and in engagement with the work.

7. In a machine of the character described, an operating spindle, a chuck mounted upon one end of said spindle, means for connecting a wire to said chuck, a longitudinally shiftable shaft, a non-rotatable former mounted upon said shaft, and having limited longitudinal movement with respect thereto, means for shifting said shaft toward the spindle to dispose the former in operative relation to the chuck, a flexible element connected to the former, and a weight connected to the end of the flexible element to yieldingly hold the former against longitudinal movement upon the shaft and retain the same in engagement with the work.

8. In a machine of the character described, an operating spindle, a chuck mounted upon said spindle, a longitudinally movable member mounted in the chuck and having an angularly disposed end adapted to clamp a wire against the end face of the chuck, a longitudinally shiftable former, a mandrel mounted therein, and means for shifting the former into operative relation to the chuck whereby said wire holding member is engaged and actuated by the mandrel to clamp the wire against the chuck.

9. In a machine of the character described, a revoluble chuck provided with a diametrically-extending channel in its end face, and a wire-receiving groove bisecting said channel and extending at right angles thereto, a spring-pressed longitudinally movable element mounted in the chuck and having an angularly-disposed rectangular end portion adapted to be received in said channel, a longitudinally-shiftable former, a mandrel carried thereby, and means for shifting the former into operative relation to the chuck and engaging the mandrel with the angular end of said spring-pressed member whereby said member is moved and the wire forced into the groove in the end face of the chuck to form a loop thereon and retain the wire in connection with the chuck.

10. In a machine of the character described, an operating spindle, a non-rotatable, longitudinally-shiftable former, a mandrel rotatably mounted in the former, wire-gripping means carried by the spindle, and means to shift said former and mandrel into operative relation to the spindle and engage the mandrel with the wire-gripping means and actuate the same to secure one end of a wire to said spindle.

11. In a machine of the character described, an operating spindle, a former, a longitudinally shiftable mandrel, a spring-pressed wire-gripping element mounted upon the spindle, and means for shifting said mandrel to engage the same with the wire-gripping element and force said element into gripping engagement with the wire to hold the same in connection with the spindle.

12. In a machine of the character described, an operating spindle, a longitudinally shiftable mandrel, a non-rotatable former having limited longitudinal movement upon the mandrel, wire-gripping means carried by the spindle, means to shift said former and mandrel into operative relation to the spindle and engage the mandrel with said wire-gripping means to actuate the same and hold the wire in connection with the spindle whereby the same is wound about the mandrel and a succession of coils formed therein by the former, and means connected to said former and operating to hold the same against movement in one direction upon the mandrel and maintain a constant pressure of the former against the wire coils.

13. In a machine of the character described, an operating spindle, a chuck mounted upon said spindle, a movable element carried by the chuck to secure a wire in connection therewith, a longitudinally shiftable mandrel, a former mounted upon the mandrel for limiting the longitudinal movement with respect thereto, means for shifting the mandrel and former into operative relation to the chuck to engage the mandrel with the wire-holding element and hold said element in gripping engagement with one end of the wire whereby the same is wound about the mandrel and coiled by said former, and a weight connected to the former to yieldably hold the same against movement in one direction upon the mandrel and maintain a constant pressure of said former against the wire coils.

In testimony whereof I hereunto affix my signature in the presence of two witnesses.

WILLIAM B. GREENLEAF.

Witnesses:
R. H. THOMPSON,
F. L. TURNER.

Copies of this patent may be obtained for five cents each, by addressing the "Commissioner of Patents, Washington, D. C."